(12) United States Patent
Wang et al.

(10) Patent No.: US 8,164,716 B2
(45) Date of Patent: Apr. 24, 2012

(54) POLARIZATION BEAM SPLITTER AND OPTICAL SYSTEM

(75) Inventors: Chien-Tang Wang, Tainan County (TW); Kuan-Hsu Fan-Chiang, Tainan County (TW); Yen-Chen Chen, Tainan County (TW)

(73) Assignee: Himax Display, Inc., Tainan (TW)

( * ) Notice: Subject to any disclaimer, the term of this patent is extended or adjusted under 35 U.S.C. 154(b) by 248 days.

(21) Appl. No.: 12/724,644

(22) Filed: Mar. 16, 2010

(65) Prior Publication Data

US 2011/0228178 A1 Sep. 22, 2011

(51) Int. Cl.
*G02F 1/13* (2006.01)
(52) U.S. Cl. .......................................... 349/96
(58) Field of Classification Search .................. 349/196
See application file for complete search history.

(56) References Cited

U.S. PATENT DOCUMENTS

2007/0273836 A1* 11/2007 Facius et al. .................... 353/20

* cited by examiner

*Primary Examiner* — Phu Vu

(74) *Attorney, Agent, or Firm* — J.C. Patents

(57) ABSTRACT

A polarization beam splitter (PBS) includes a first prism, a second prism, an alignment layer, and a cholesteric liquid crystal (CLC) layer. The first prism has two first surfaces adjacent to each other and a first slanted surface that forms a first included angle with the two first surfaces, respectively. The second prism has two second surfaces adjacent to each other and a second slanted surface that forms a second included angle with the two second surfaces, respectively. The second slanted surface is opposite to the first slanted surface. The alignment layer is disposed on the first slanted surface of the first prism. The CLC layer is disposed between the alignment layer and the second slanted surface of the second prism.

18 Claims, 6 Drawing Sheets

POLARIZATION BEAM SPLITTER AND OPTICAL SYSTEM

BACKGROUND OF THE INVENTION

1. Field of Invention

The invention relates to a polarization beam splitter (PBS) and an optical system. More particularly, the invention relates to a PBS generating a polarized light beam by employing a cholesteric liquid crystal (CLC) layer and an optical system having the PBS.

2. Description of Related Art

Polarization beam splitters (PBSs) have been extensively applied to various optical systems for providing the optical systems with polarized light beams having specific polarization directions. For instance, the PBSs are used in liquid crystal projectors on market to transform light beams generated by light sources into polarized light beams which can be utilized by liquid crystal light valves. As such, images can be projected by means of the polarized light beams.

In general, the PBSs have following designs: wire-grid polarizers (WGPs), thin-film polarizers (TFPs), polymer-film polarizers (PFPs), and so on. However, the complicated structures and high manufacturing costs of the conventional PBSs hinder the development of such PBSs.

SUMMARY OF THE INVENTION

In view of the above, the invention is directed to a polarization beam splitter (PBS) having a simple structure and capable of generating a polarized light beam by means of a cholesteric liquid crystal (CLC) layer.

The invention is further directed to an optical system having said PBS capable of generating a polarized image light beam.

In the invention, a PBS including a first prism, a second prism, an alignment layer, and a CLC layer is provided. The first prism has two first surfaces adjacent to each other and a first slanted surface that forms a first included angle with the two first surfaces, respectively. The second prism has two second surfaces adjacent to each other and a second slanted surface that forms a second included angle with the two second surfaces, respectively. The second slanted surface is opposite to the first slanted surface. The alignment layer is disposed on the first slanted surface of the first prism. The CLC layer is disposed between the alignment layer and the second slanted surface of the second prism.

In an exemplary embodiment of the invention, a thickness of the CLC layer ranges from 0.5 μm to 2 μm.

In an exemplary embodiment of the invention, the CLC layer includes a polymer material and a plurality of CLC molecules. The CLC molecules are distributed into the polymer material. Here, the polymer material can be an ultraviolet curable polymer material.

In an exemplary embodiment of the invention, the alignment layer has an alignment pattern.

In an exemplary embodiment of the invention, the PBS further includes a multi-layer film disposed on the CLC layer and located between the CLC layer and the second slanted surface.

In the invention, an optical system including a PBS, a first display panel, a second display panel, and a light source is also provided. The PBS includes a first prism, a second prism, an alignment layer, and a CLC layer. The first prism has two first surfaces adjacent to each other and a first slanted surface that forms a first included angle with the two first surfaces, respectively. The second prism has two second surfaces adjacent to each other and a second slanted surface that forms a second included angle with the two second surfaces, respectively. The second slanted surface is opposite to the first slanted surface. The alignment layer is disposed on the first slanted surface of the first prism. The CLC layer is disposed between the alignment layer and the second slanted surface of the second prism. The first display panel is disposed parallel to one of the two first surfaces of the first prism. The second display panel is disposed parallel to one of the two second surfaces of the second prism. The first display panel is adjacent to the second display panel. The light source provides a light beam entering the PBS. The light beam has a first polarization state and a second polarization state. The light beam entering the first prism and having the first polarization state is reflected by the CLC layer, moved toward the first display panel, and transformed by the first display panel into a first image light beam having the second polarization state. The first image light beam returns to the first prism, passes through the CLC layer, and is emitted from the second prism. The light beam entering the first prism and having the second polarization state passes through the CLC layer and the second prism, moves toward the second display panel, and is transformed by the second display panel into a second image light beam having the first polarization state. The second image light beam returns to the second prism, is reflected by the CLC layer, and is emitted from the second prism.

In the invention, an optical system including a PBS and a light source is also provided. The PBS includes a silicon-based reflective liquid crystal panel, an alignment layer, and a CLC layer. The alignment layer is disposed on the silicon-based reflective liquid crystal panel. The CLC layer is disposed on the alignment layer. The light source provides a light beam entering the PBS. The light beam has a first polarization state and a second polarization state. When the light beam enters the PBS, the light beam is transformed by the silicon-based reflective liquid crystal panel into an image light beam having the first polarization state or the second polarization state. Here, the silicon-based reflective liquid crystal panel allows the image light beam having the first polarization state or the second polarization state to pass through the CLC layer, and the image light beam is then emitted.

In the invention, an optical system including a transmissive liquid crystal panel, a first PBS, a second PBS, and a light source is also provided. The transmissive liquid crystal panel has a first surface and a second surface opposite to the first surface. The first PBS is disposed on the first surface of the transmissive liquid crystal display panel. Besides, the first PBS includes a first alignment layer and a first CLC layer. The first alignment layer is disposed on the first surface, and the first CLC layer is disposed on the first alignment layer. The second PBS is disposed on the second surface of the transmissive liquid crystal display panel. Besides, the second PBS includes a second alignment layer and a second CLC layer. The second alignment layer is disposed on the second surface, and the second CLC layer is disposed on the second alignment layer. The light source provides a light beam having a first polarization state and a second polarization state. The light beam enters the first PBS, the transmissive liquid crystal panel, and the second PBS from the first surface. The light beam having the first polarization state passes through the first PBS and is transformed by the transmissive liquid crystal panel into an image light beam having the second polarization state. The image light beam having the second polarization state passes through the second PBS and is emitted.

In light of the foregoing, the CLC layer is employed in the PBS of the invention, such that polarization effects can be generated by the light beam entering the CLC layer. The CLC layer can be formed on a substrate by spin coating, which is rather easy and simple. In addition, the polarized light beam with required wavelength can be generated by adjusting the thickness of the CLC layer. On the other hand, the aforesaid PBS is adopted in the optical system of the invention, so as to simplify relevant fabrication process of the optical system.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention and are incorporated in and constitute a part of this specification. The drawings illustrate embodiments of the invention and, together with the descriptions, serve to explain the principles of the invention. In the drawings.

DESCRIPTION OF EMBODIMENTS

Polarization Beam Splitter (PBS)

Figure 1:
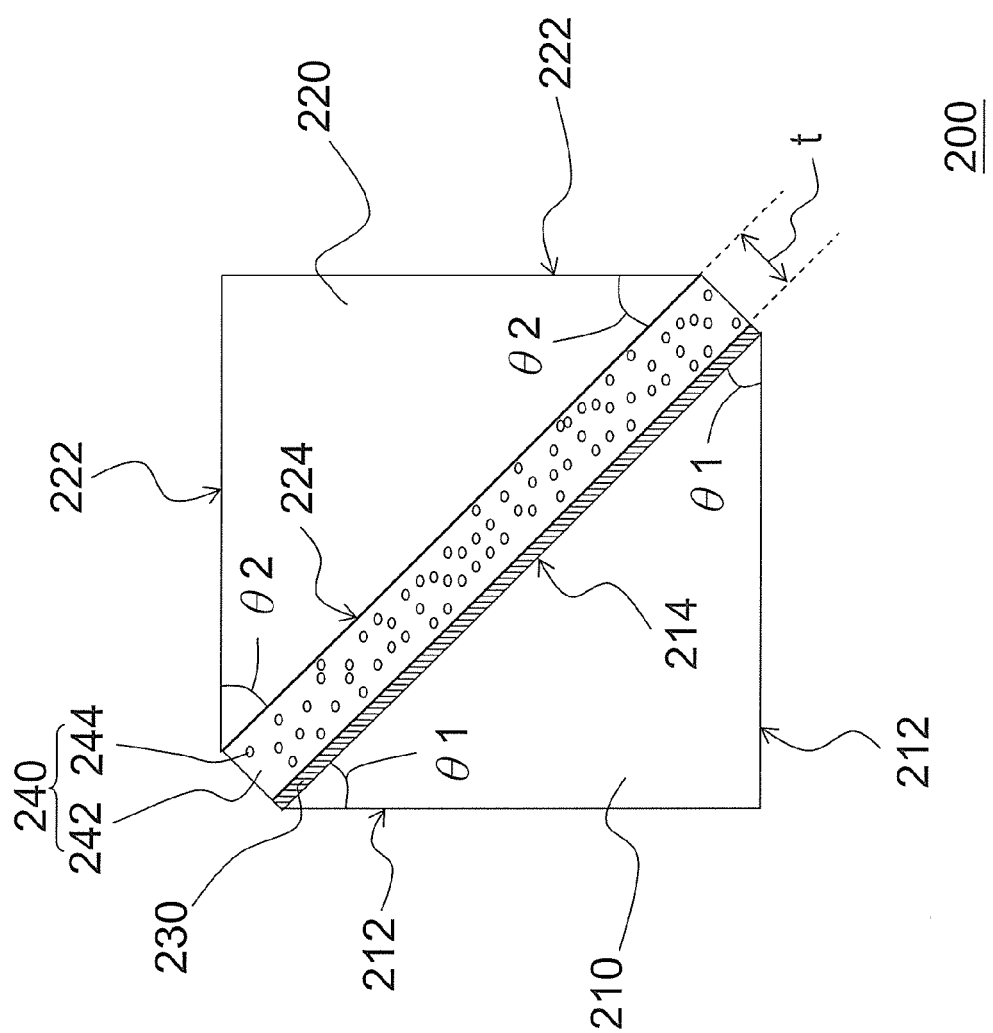
FIG. 1 is a schematic view illustrating a polarization beam splitter (PBS) according to an embodiment of the invention.

FIG. 1 is a schematic view illustrating a PBS according to an embodiment of the invention. As indicated in FIG. 1, a PBS 200 includes a first prism 210, a second prism 220, an alignment layer 230, and a cholesteric liquid crystal (CLC) layer 240. The first prism 210 has two first surfaces 212 adjacent to each other and a first slanted surface 214 that forms a first included angle θ1 with the two first surfaces 212, respectively. The second prism 220 has two second surfaces 222 adjacent to each other and a second slanted surface 224 that forms is a second included angle θ2 with the two second surfaces 222, respectively. The second slanted surface 224 is opposite to the first slanted surface 214. The alignment layer 230 is disposed on the first slanted surface 214 of the first prism 210. The CLC layer 240 is disposed between the alignment layer 230 and the second slanted surface 224 of the second prism 220.

With reference to FIG. 1, polarized light beams can be generated due to polarization properties of the CLC layer 240 of the PBS 200. The CLC layer 240 may includes a polymer material 242 and a plurality of CLC molecules 244 distributed into the polymer material 242. The polymer material 242 is, for example, an ultraviolet curable polymer material. The CLC molecules 244 in the CLC layer 240 are in a chiral nematic phase, such that the light beams are polarized after passing through the CLC layer 240. When the polymer material 242 is irradiated by the ultraviolet light beam and cured, the CLC molecules 244 in the CLC layer 240 stay in the chiral nematic phase.

A thickness t of the CLC layer 240 in the PBS 200 ranges from 0.5 μm to 2 μm, for instance. It should be mentioned that the CLC layer 240 can filter light beams with greater wavelengths when the thickness t of the CLC layer 240 is large. On the contrary, the CLC layer 240 can filter light beams with shorter wavelengths when the thickness t of the CLC layer 240 is small. By adjusting the thickness t of the CLC layer 240, the polarized light beams with different required wavelengths can be filtered by the CLC layer 240.

In addition, the alignment layer 230 in the PBS 200 has an alignment pattern (not shown), for example. The alignment pattern on the alignment layer 230 controls tilt angles of the CLC molecules 244. In particular, the CLC layer 240 is formed on the alignment layer 230 by spin coating, and the tilt angles of the CLC molecules 244 and the thickness t of the CLC layer 240 can be simultaneously controlled. As such, the polarized light beams with specific wavelengths can be filtered by the CLC layer 240.

Moreover, as shown in FIG. 1, a material of the first prism 210 or a material of the second prism 220 is a transparent organic material or transparent glass, for instance. The first included angle θ1 formed by the two first surfaces 212 and the first slanted surface 214 of the first prism 210 can be 45 degrees. The second included angle θ2 formed by the two second surfaces 222 and the second slanted surface 224 of the second prism 220 can be 45 degrees as well. That is to say, the first prism 210 or the second prism 220 has a shape of an isosceles right-angled triangle, for example.

Figure 2:
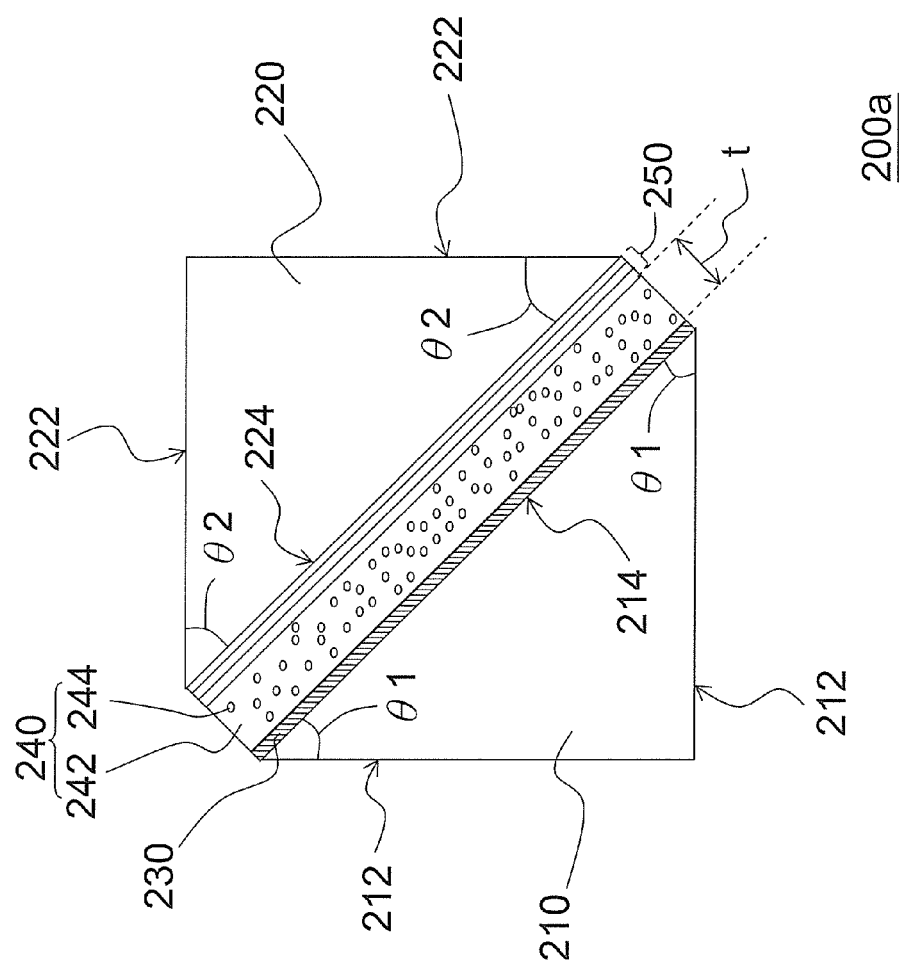
FIG. 2 is a schematic view illustrating a PBS according to another embodiment of the invention.

FIG. 2 is a schematic view illustrating a PBS according to another embodiment of the invention. In FIG. 2, a PBS 200a is substantially the same as the PBS 200. Therefore, same elements of the PBS 200a and the PBS 200 are labeled by the same reference numbers, and no further descriptions are provided herein.

With reference to FIG. 2, the PBS 200a further includes a multi-layer film 250 disposed on the CLC layer 240 and located between the CLC layer 240 and the second slanted surface 224. The multi-layer film 250 can protect the CLC layer 240 and improve a transmission rate of the polarized light beams which pass through the CLC layer 240. Furthermore, the multi-layer film 250 can increase the wavelength range of the light beams which are filtered by the PBS 200a.

According to the above embodiments, both the PBS 200 and the PBS 200a have the CLC layer 240, and therefore the polarized light beams can be generated because of optical properties of the CLC layer 240. Specifically, the PBSs 200 and 200a with simple structures can be formed by adopting the CLC layer 240 together with the first and the second prisms 210 and 220.

Besides, before the CLC layer 240 is cured, the CLC layer 240 with specific thickness can be formed on the first slanted surface 214 of the first prism 210 or on the second slanted surface 224 of the second prism 220. Namely, the thickness of the CLC layer 240 can be easily controlled, so as to generate the polarized light beams with specific wavelengths.

Optical System

Figure 3:
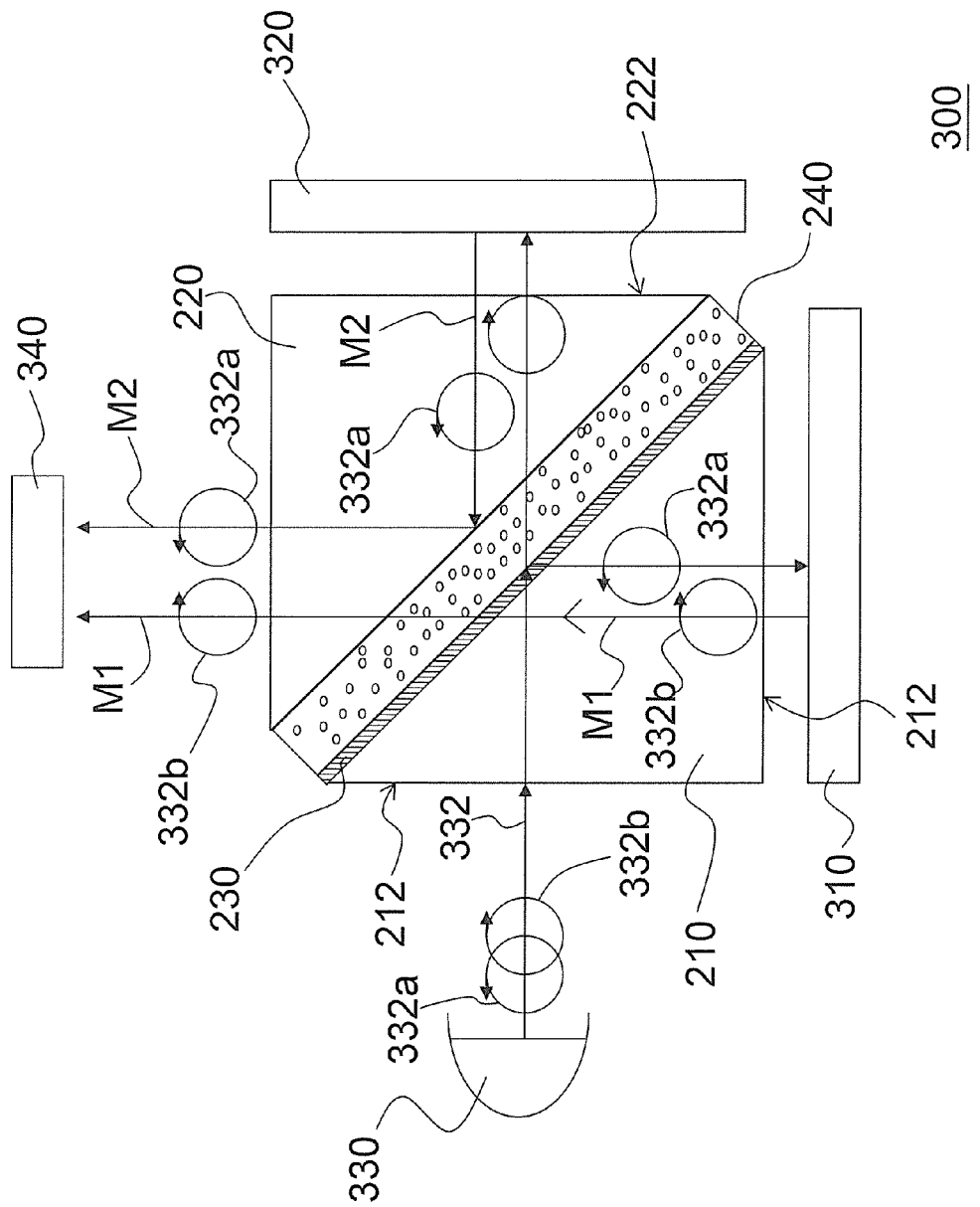
FIG. 3 is a schematic view illustrating an optical system according to an embodiment of the invention.

FIG. 3 is a schematic view illustrating an optical system according to an embodiment of the invention. As indicated in FIG. 3, the optical system 300 includes the aforesaid PBS 200, a first display panel 310, a second display panel 320, and a light source 330. The PBS 200 herein is the same as the PBS described above, and thus relevant descriptions are omitted herein.

In FIG. 3, the first display panel 310 is disposed parallel to one of the two first surfaces 212 of the first prism 210. The second display panel 320 is disposed parallel to one of the two second surfaces 222 of the second prism 220, and the first display panel 310 is adjacent to the second display panel 320. The light source 330 provides a light beam 332 entering the PBS 200. The light beam 332 has a first polarization state 332a and a second polarization state 332b.

With reference to FIG. 3, in the optical system 300, the light beam 332 entering the first prism 210 and having the first polarization state 332a is reflected by the CLC layer 240 and moved toward the first display panel 310. The light beam 332 having the first polarization state 332a is transformed by the first display panel 310 into a first image light beam M1 having the second polarization state 332b. The first image light beam M1 then returns to the first prism 210, passes through the CLC layer 240, and is emitted from the second prism 220.

On the other hand, the light beam 332 entering the first prism 210 and having the second polarization state 332b passes through the CLC layer 240 and the second prism 220 and moves toward the second display panel 320. The light beam 332 having the second polarization state 332b is transformed by the second display panel 320 into a second image light beam M2 having the first polarization state 332a. The second image light beam M2 then returns to the second prism 220, is reflected by the CLC layer 240, and is emitted from the second prism 220.

The optical system 300 can further include a projection lens 340 disposed on a light path between the first image light beam M1 and the second image light beam M2. In other words, the optical system 300 depicted in FIG. 3 is a two-plate type liquid crystal projector capable of projecting images, for instance.

According to other embodiments, the PBS 200 in the optical system 300 can be replaced by the PBS 200a depicted in FIG. 2, such that the optical system 300 can filter the light beams with relatively large wavelength range, or that the CLC layer 240 can be protected to a better extent.

Figure 4:
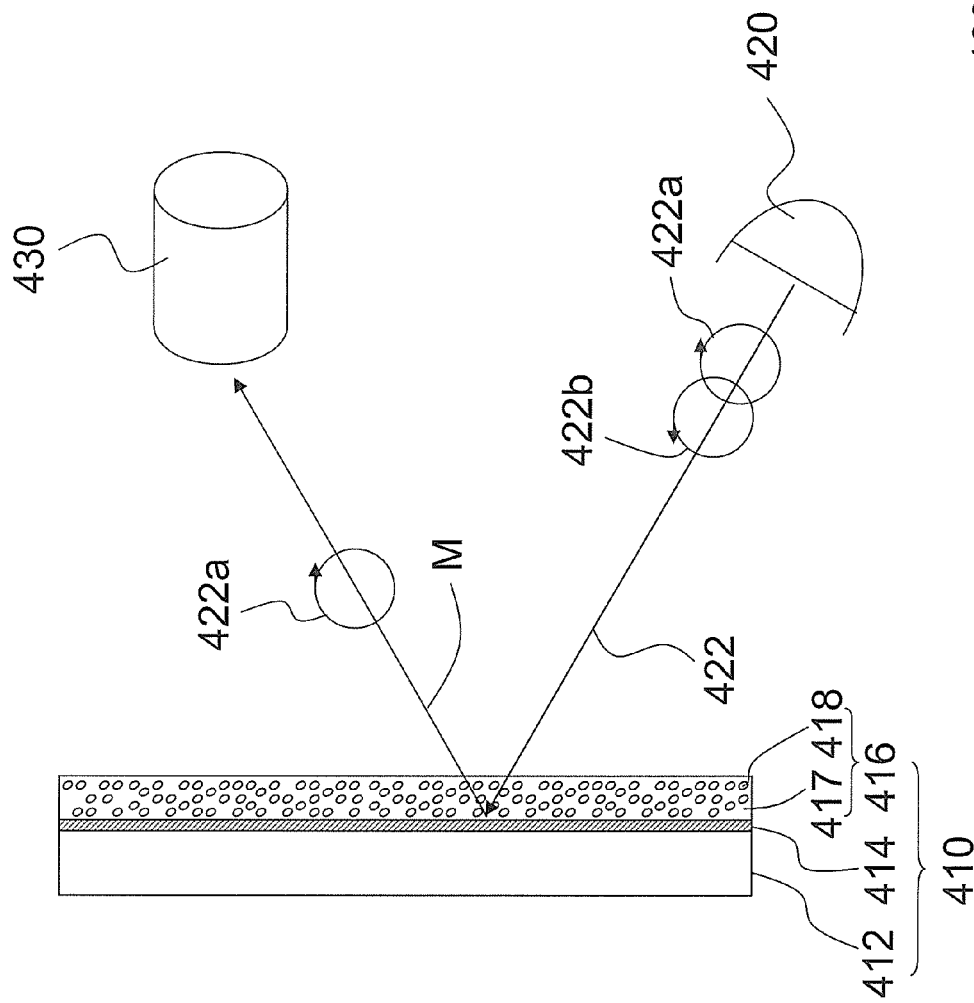
FIG. 4 is a schematic view illustrating an optical system according to another embodiment of the invention.

FIG. 4 is a schematic view illustrating an optical system according to another embodiment of the invention. As illustrated in FIG. 4, the optical system 400 includes a PBS 410 and a light source 420. The PBS 410 includes a silicon-based reflective liquid crystal panel (i.e., Liquid Crystal On Silicon panel, LCOS panel) 412, an alignment layer 414, and a CLC layer 416. The alignment layer 414 is disposed on the LCOS panel 412, and the CLC layer 416 is disposed on the alignment layer 414.

With reference to FIG. 4, the light source 420 provides a light beam 422 entering the PBS 410. The light beam 422 has a first polarization state 422a and a second polarization state 422b. When the light beam 422 enters the PBS 410, the light beam 422 is transformed by the LCOS panel 412 into an image light beam M having the first polarization state 422a or the second polarization state 422b (the first polarization state 422a is exemplarily shown in FIG. 4). Besides, in the embodiment illustrated in FIG. 4, the LCOS panel 412 makes the image light beam M having the first polarization state 422a to pass through the CLC layer 416, and the image light beam M is then emitted. According to other embodiments, the LCOS panel 412 makes the image light beam M having the second polarization state 422b to pass through the CLC layer 416, and the image light beam M is then emitted.

Likewise, in the optical system 400, the material of the CLC layer 416, the thickness thereof, and the alignment pattern (not shown) of the alignment layer 414 are already described above together with FIG. 1. Hence, no further descriptions are provided herein. Note that the polarized light beams with different required wavelengths can be filtered by the CLC layer 416 through adjusting the thickness t of the CLC layer 416 and the tilt angles of the CLC molecules 244.

In FIG. 4, the optical system 400 further includes a projection lens 430 disposed on a light path of the image light beam M which is an emergent image light beam and has the first polarization state 422a. In other words, the optical system 400 depicted in FIG. 4 is a reflective liquid crystal projector capable of projecting images, for instance.

Figure 5A:
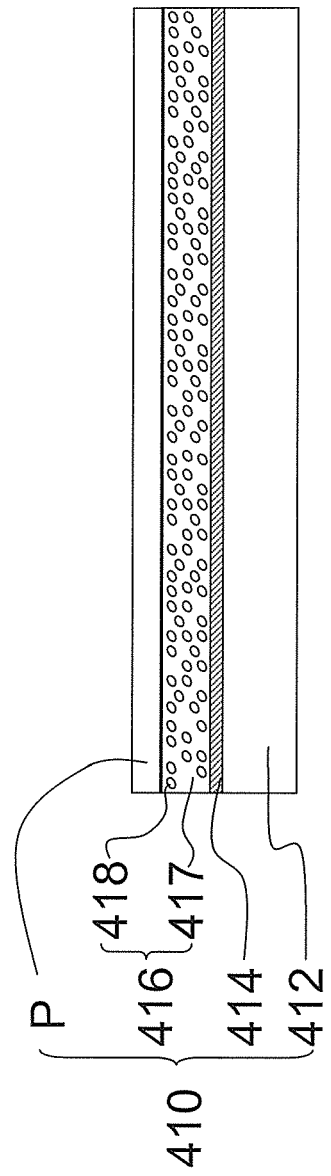
FIGS. 5A and 5B are schematic views illustrating two optical systems according to still another embodiment of the invention.
Figure 5B:
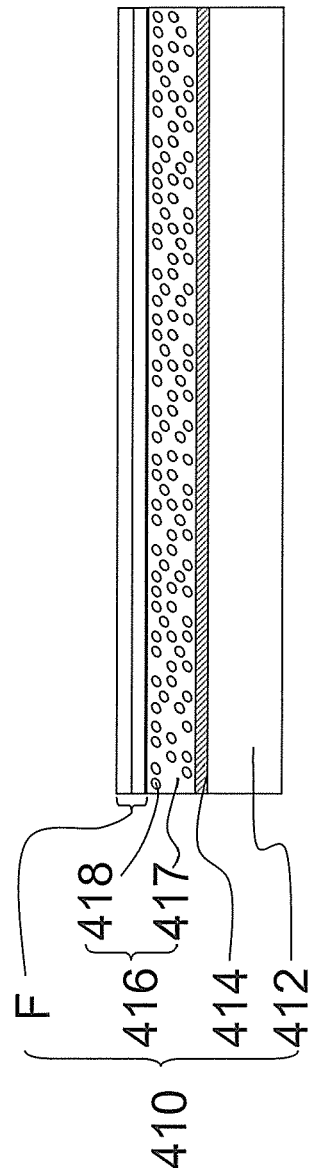

FIGS. 5A and 5B are schematic views illustrating two optical systems according to still another embodiment of the invention. In the embodiment depicted in FIG. 5A, the PBS 410 can further include a passivation layer P disposed on the CLC layer 416. The passivation layer P can protect the CLC layer 416 from being damaged by moisture or external force. A material of the passivation layer P is, for example, glass or any other protective material. In the embodiment depicted in FIG. 5B, the PBS 410 includes a multi-layer film F disposed on the CLC layer 416. The multi-layer film F can achieve additional optical effects for the PBS 410. For instance, the light beam which can be filtered by the PBS 410 can have increased wavelength ranges, or the PBS 410 can have an improved transmission rate as a whole.

It can be learned from the above that the CLC layer 416 can be directly formed on the LCOS panel 412, such that the optical system 400 is capable of projecting the polarized image light beam M.

Figure 6:
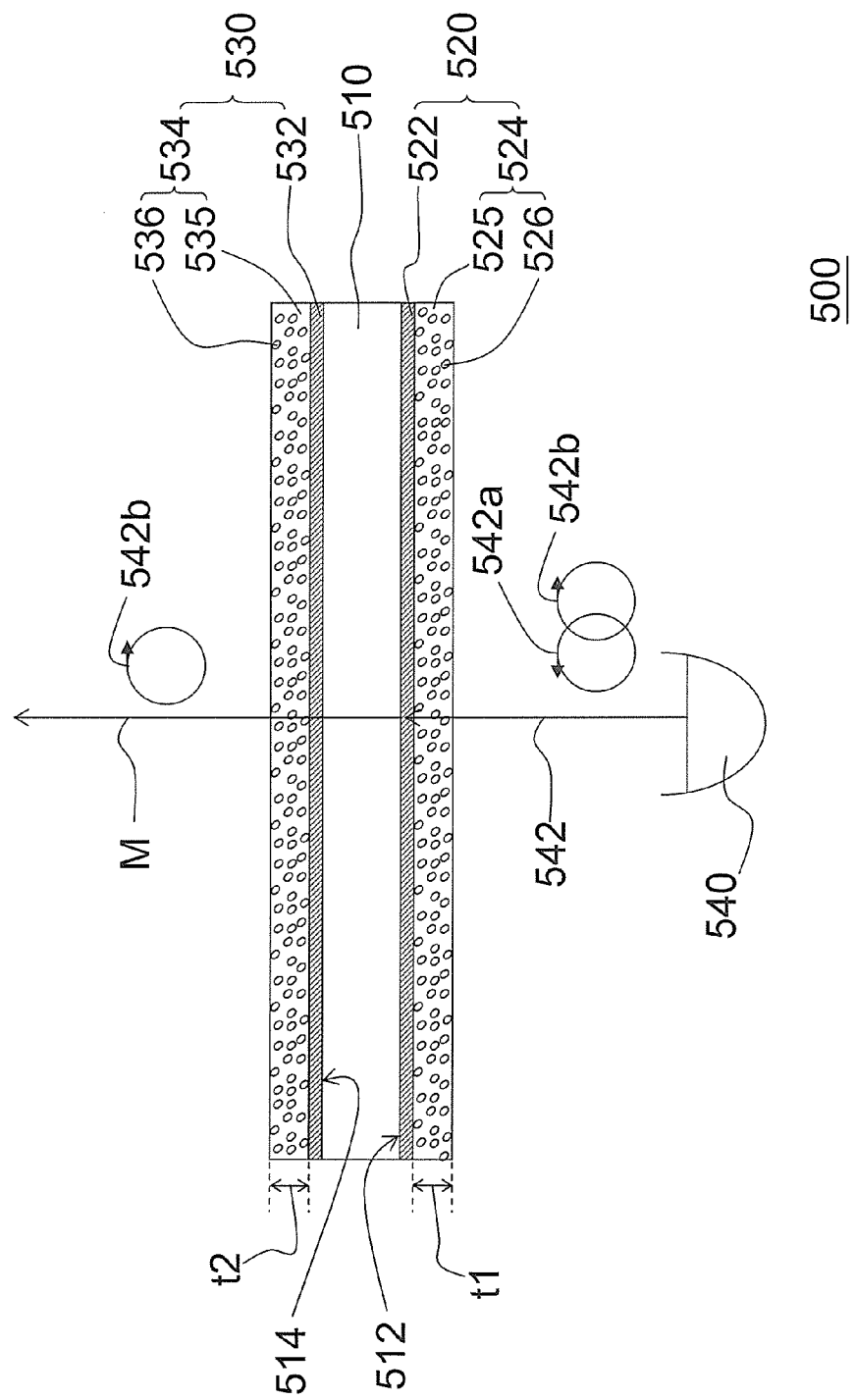
FIG. 6 is a schematic view illustrating an optical system according to still another embodiment of the invention.

FIG. 6 is a schematic view illustrating an optical system according to still another embodiment of the invention. As indicated in FIG. 6, the optical system 500 includes a transmissive liquid crystal panel 510, a first PBS 520, a second PBS 530, and a light source 540.

With reference to FIG. 6, the transmissive liquid crystal panel 510 has a first surface 512 and a second surface 514 opposite to the first surface 512. The first PBS 520 is disposed on the first surface 512 of the transmissive liquid crystal display panel 510. Besides, the first PBS 520 includes a first alignment layer 522 and a first CLC layer 524. The first alignment layer 522 is disposed on the first surface 512, and the first CLC layer 524 is disposed on the first alignment layer 522. On the other hand, the second PBS 530 is disposed on the second surface 514 of the transmissive liquid crystal display panel 510. The second PBS 530 includes a second alignment layer 532 and a second CLC layer 534. The second alignment layer 532 is disposed on the second surface 514, and the second CLC layer 534 is disposed on the second alignment layer 532.

In FIG. 6, the light source 540 provides a light beam 542 having a first polarization state 542a and a second polarization state 542b. The light beam 542 enters the first PBS 520, the transmissive liquid crystal panel 510, and the second PBS 530 from the first surface 512. The light beam 542 having the first polarization state 542a passes through the first PBS 520 and is transformed by the transmissive liquid crystal panel 510 into an image light beam M having the second polarization state 542b. The image light beam M having the second polarization state 542b passes through the second PBS 530 and is then emitted.

In the optical system 500, a thickness t1 of the first CLC layer 524 or a thickness t2 of the second CLC layer 534 ranges from 0.5 μm to 2 μm, for instance. The polarized light beam with the required wavelength can be filtered by adjusting the thickness t1 of the first CLC layer 524 or the thickness t2 of the second CLC layer 534.

The first CLC layer 524 includes a polymer material 525 and a plurality of CLC molecules 526 distributed into the polymer material 525. The second CLC layer 534 includes a polymer material 535 and a plurality of CLC molecules 536 distributed into the polymer material 535. Here, the polymer materials 525 and 535 are, for example, ultraviolet curable polymer materials.

Additionally, in the optical system 500, the first alignment layer 522 or the second alignment layer 532 can respectively have an alignment pattern (not shown). The alignment pattern on the first alignment layer 522 or the alignment pattern on the second alignment layer 532 can control tilt angles of the CLC molecules 526 or 536.

It can be learned that the first and the second CLC layers 524 and 534 of the optical system 500 can replace polarizers conventionally disposed at respective sides of the liquid crystal display panel, and the image light beam M can be projected based on the deflection of the liquid crystal layer in the transmissive liquid crystal panel 510.

Based on the above, the PBS and the optical system of the invention at least have following features.

The CLC layer is employed in the PBS, and thus the light beam can be polarized due to the optical properties of the CLC layer. Moreover, the thickness of the CLC layer can be easily controlled by spin coating, so as to form the PBS capable of filtering the polarized light beams with different wavelengths. Besides, the optical system is equipped with the aforesaid PBS, and therefore the optical system can transform the light beams provided by the light source into the polarized image light beams.

The specific embodiments of the invention that have been described above are merely illustrative of certain applications of the principle of the invention. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polarization beam splitter, comprising:
   a first prism having two first surfaces and a first slanted surface, the two first surfaces being adjacent to each other, the first slanted surface forming a first included angle with the two first surfaces, respectively;
   a second prism having two second surfaces and a second slanted surface, the two second surfaces being adjacent to each other, the second slanted surface forming a second included angle with the two second surfaces, respectively, the second slanted surface being opposite to the first slanted surface;
   an alignment layer disposed on the first slanted surface of the first prism; and
   a cholesteric liquid crystal layer disposed between the alignment layer and the second slanted surface of the second prism.

2. The polarization beam splitter as claimed in claim 1, wherein a thickness of the cholesteric liquid crystal layer ranges from 0.5 µm to 2 µm.

3. The polarization beam splitter as claimed in claim 1, wherein the cholesteric liquid crystal layer comprises:
   a polymer material; and
   a plurality of cholesteric liquid crystal molecules distributed into the polymer material.

4. The polarization beam splitter as claimed in claim 3, wherein the polymer material comprises an ultraviolet curable polymer material.

5. The polarization beam splitter as claimed in claim 1, wherein the alignment layer has an alignment pattern.

6. The polarization beam splitter as claimed in claim 1, further comprising:
   a multi-layer film disposed on the cholesteric liquid crystal layer and located between the cholesteric liquid crystal layer and the second slanted surface.

7. An optical system, comprising:
   a polarization beam splitter comprising:
      a first prism having two first surfaces and a first slanted surface, the two first surfaces being adjacent to each other, the first slanted surface forming a first included angle with the two first surfaces, respectively;
      a second prism having two second surfaces and a second slanted surface, the two second surfaces being adjacent to each other, the second slanted surface forming a second included angle with the two second surfaces, respectively, the second slanted surface being opposite to the first slanted surface;
      an alignment layer disposed on the first slanted surface of the first prism;
      a cholesteric liquid crystal layer disposed between the alignment layer and the second slanted surface of the second prism;
   a first display panel disposed parallel to one of the two first surfaces of the first prism;
   a second display panel disposed parallel to one of the two second surfaces of the second prism, the first display panel being adjacent to the second display panel;
   a light source providing a light beam entering the polarization beam splitter, the light beam having a first polarization state and a second polarization state,
   wherein the light beam entering the first prism and having the first polarization state is reflected by the cholesteric liquid crystal layer, moved toward the first display panel, and transformed by the first display panel into a first image light beam having the second polarization state, the first image light beam returns to the first prism, passes through the cholesteric liquid crystal layer, and is emitted from the second prism;
   the light beam entering the first prism and having the second polarization state passes through the cholesteric liquid crystal layer and the second prism, moves toward the second display panel, and is transformed by the second display panel into a second image light beam having the first polarization state, and the second image light beam returns to the second prism, is reflected by the cholesteric liquid crystal layer, and is emitted from the second prism.

8. The optical system as claimed in claim 7, wherein a thickness of the cholesteric liquid crystal layer ranges from 0.5 µm to 2 µm.

9. The optical system as claimed in claim 7, wherein the cholesteric liquid crystal layer comprises:
   a polymer material; and
   a plurality of cholesteric liquid crystal molecules distributed into the polymer material.

10. The optical system as claimed in claim 9, wherein the polymer material comprises an ultraviolet curable polymer material.

11. The optical system as claimed in claim 7, wherein the alignment layer has an alignment pattern.

12. The optical system as claimed in claim 7, wherein the polarization beam splitter further comprises:
   a multi-layer film disposed on the cholesteric liquid crystal layer and located between the cholesteric liquid crystal layer and the second slanted surface.

13. An optical system, comprising:
   a polarization beam splitter comprising:
      a silicon-based reflective liquid crystal panel;
      an alignment layer disposed on the silicon-based reflective liquid crystal panel;
      a cholesteric liquid crystal layer disposed on the alignment layer; and a light source providing a light beam entering the polarization beam splitter, the light beam having a first polarization state and a second polarization state, wherein when the light beam enters the polarization beam splitter, the light beam is transformed by the silicon-based reflective liquid crystal panel into an image light beam having the first polarization state or the second polarization state, and the image light beam passes through the cholesteric liquid crystal layer and is emitted.

14. The optical system as claimed in claim 13, wherein a thickness of the cholesteric liquid crystal layer ranges from 0.5 µm to 2 µm.

15. The optical system as claimed in claim 13, wherein the cholesteric liquid crystal layer comprises:

a polymer material; and a plurality of cholesteric liquid crystal molecules distributed into the polymer material.

16. The optical system as claimed in claim 13, wherein the polarization beam splitter further comprises a passivation layer disposed on the cholesteric liquid crystal layer.

17. The optical system as claimed in claim 13, further comprising:

a multi-layer film disposed on the cholesteric liquid crystal layer.

18. An optical system, comprising:

a transmissive liquid crystal panel having a first surface and a second surface opposite to the first surface;

a first polarization beam splitter disposed on the first surface of the transmissive liquid crystal display panel and comprising:

a first alignment layer disposed on the first surface;

a first cholesteric liquid crystal layer disposed on the first alignment layer;

a second polarization beam splitter disposed on the second surface of the transmissive liquid crystal display panel and comprising:

a second alignment layer disposed on the second surface;

a second cholesteric liquid crystal layer disposed on the second alignment layer; and a light source providing a light beam having a first polarization state and a second polarization state, the light beam entering the first polarization beam splitter, the transmissive liquid crystal panel, and the second polarization beam splitter from the first surface, wherein the light beam having the first polarization state passes through the first polarization beam splitter and is transformed by the transmissive liquid crystal panel into an image light beam having the second polarization state, and the image light beam passes through the second polarization beam splitter and is emitted.

* * * * *